(12) United States Patent
Mangione-Smith

(10) Patent No.: US 8,327,358 B2
(45) Date of Patent: Dec. 4, 2012

(54) HYPERVISOR DRIVER MANAGEMENT IN VIRTUAL MACHINE ENVIRONMENTS

(75) Inventor: William H. Mangione-Smith, Kirkland, WA (US)

(73) Assignee: Empire Technology Development LLC, Wilmington, DE (US)

( * ) Notice: Subject to any disclaimer, the term of this patent is extended or adjusted under 35 U.S.C. 154(b) by 483 days.

(21) Appl. No.: 12/635,319

(22) Filed: Dec. 10, 2009

(65) Prior Publication Data

US 2011/0145814 A1 Jun. 16, 2011

(51) Int. Cl.
G06F 9/46 (2006.01)
G06F 9/455 (2006.01)
G06F 13/00 (2006.01)
G06F 9/44 (2006.01)

(52) U.S. Cl. ............ 718/1; 718/108; 717/121; 717/127; 717/131; 719/327

(58) Field of Classification Search ............... 718/1–105, 718/108; 719/321–327; 717/120–135; 710/5–28
See application file for complete search history.

(56) References Cited

U.S. PATENT DOCUMENTS

| | | | |
|---|---|---|---|
| 6,944,699 | B1 | 9/2005 | Bugnion et al. |
| 7,779,424 | B2 * | 8/2010 | Cherkasova et al. .......... 719/321 |
| 2004/0019895 | A1 | 1/2004 | Dubal |
| 2005/0246453 | A1 | 11/2005 | Erlingsson et al. |
| 2006/0242402 | A1 | 10/2006 | Swift et al. |
| 2007/0006178 | A1 | 1/2007 | Tan |
| 2008/0028399 | A1 | 1/2008 | Gupta et al. |
| 2008/0162272 | A1* | 7/2008 | Huang et al. .................... 705/11 |
| 2009/0049453 | A1 | 2/2009 | Baran et al. |
| 2009/0138625 | A1* | 5/2009 | Lee et al. ......................... 710/23 |
| 2009/0183183 | A1* | 7/2009 | Muppirala et al. ............ 719/327 |
| 2009/0199216 | A1* | 8/2009 | Gallagher et al. ............ 719/321 |
| 2009/0265500 | A1* | 10/2009 | Kyusojin ....................... 710/308 |

FOREIGN PATENT DOCUMENTS

| | | |
|---|---|---|
| JP | 2009-265687 A | 11/2009 |
| JP | 5032606 B | 7/2012 |
| KR | 2006-0047639 A | 5/2006 |
| KR | 2008-0000638 A | 1/2008 |
| WO | 2009/133015 A1 | 11/2009 |

OTHER PUBLICATIONS

Jiuxing Liu; High Performance VMM-Bypass I/O in Virtual Machines; USENIX 2006; 14 pages.*
Wei Huang; A Case for High Performance Computing with Virtual Machines; ACM 2006; 10 pages.*
Vinod Ganapathy; The Design and Implementation of Microdrivers; ACM Mar. 2005; 11 pages.*

(Continued)

*Primary Examiner* — Abdullah Al Kawsar
(74) *Attorney, Agent, or Firm* — Maschoff Gilmore & Israelsen

(57) ABSTRACT

Techniques for providing access to physical resources in a virtual machine environment are provided. A virtual machine may access physical resources using device drivers that have been divided. After monitoring a performance of device drivers operating in a virtual machine, the device drivers that are underperforming or that experience a high rate of context switches are identified. These device drivers are adapted dynamically into portions that execute in an untrusted domain and in a trusted domain. Running a portion of the device driver in the trusted domain eliminates context switches and improves performance of the virtual machine.

19 Claims, 5 Drawing Sheets

OTHER PUBLICATIONS

EP Search Report dated Feb. 6, 2012 as related application No. 10 15 2865.1.
Aravind Menon, et al "TwinDrivers: Semi-Automatic Derivation of Fast and Safe Hypervisor Network Drivers from Guest OS Drivers" APLOS '09, Mar. 7-11, 2009, WAshington, DC, USA [Online: http://infoscience.epfl.ch/record/125975/files/paper.pdf].
Paul Barham, et al "Xen and the Art of Virtualization" SOSP '03, Oct. 19-22, 2003, Bolton Landing, New York, USA [Online: http://www.cl.cam.ac.uk/research/srg/netos/papers/2003-xensosp.pdf].
Ulfar Erlingsson, et al "XFI: Software Guards for System Address Spaces" Operating Systems Design and Implementation (OSDI), 2006 [Online: http://cseweb.ucsd.edu/~mvrable/papers/2006-osdi-xfi.pdf].
Keir Fraser, et al "Safe Hardware Access with the Xen Virtual Machine Monitor" OASIS, Oct. 2004 [Online: http://www.cl.cam.ac.uk/research/srg/netos/papers/2004-oasis-ngio.pdf].
Japanese Office Action dated Feb. 14, 2012 as application No. 2010-024988.
Summary of Korean Office Action dated Mar. 18, 2011 as application No. 2010-0017262.
Levasseur, "Device driver reuse via virtual machines," May 2009, School of Computer Science and Engineering, University of New South Wales.

* cited by examiner

HYPERVISOR DRIVER MANAGEMENT IN VIRTUAL MACHINE ENVIRONMENTS

BACKGROUND

Virtual machines provide many advantages in complex computing environments. They allow multiple operating systems execute on the same computer. The physical resources of the computer are virtualized so that the physical resources can be shared among all of the different operating systems. Each virtual machine sees itself as a real computer, even though it is implemented in software.

Virtual machines also have other advantages in addition to allowing multiple operating systems to co-exist on the same computer. Virtual machines, for example, can run independently of the underlying hardware, are isolated from each other even when executing on the same machine, and are easily provisioned and maintained.

The primary disadvantage of a virtual machine is related to efficiency. More specifically, virtual machines are not as efficient as conventional operating systems operating natively. A virtual machine is a software implementation of a computer and typically has no dedicated hardware components.

In operation, however, the virtual machine environment that allows the instantiation of virtual machines introduces additional software layers between the virtual machines and the physical resources of the computer. As a result, virtual machines are less efficient that natively executing systems because virtual machines access the physical resources of the computer indirectly.

For example, virtual machines often use virtual device drivers and it is often desirable to execute the virtual device drivers inside the virtual machines. Alternatively, virtual device drivers can be instantiated in their own virtual machine. By implementing virtual device drivers, other layers of the virtual machine environment and other virtual machines can be isolated from problems in the virtual device driver. Unfortunately, virtual machines do not have direct access to the physical resources of the computer.

As a result, virtual machines are often associated with context switches from the application to the virtual device driver and from the virtual device driver to the underlying layers of the virtual machine environment. The potentially high rate of context switches is one of the sources of reduced performance in virtual machines.

DETAILED DESCRIPTION

Figure 1:
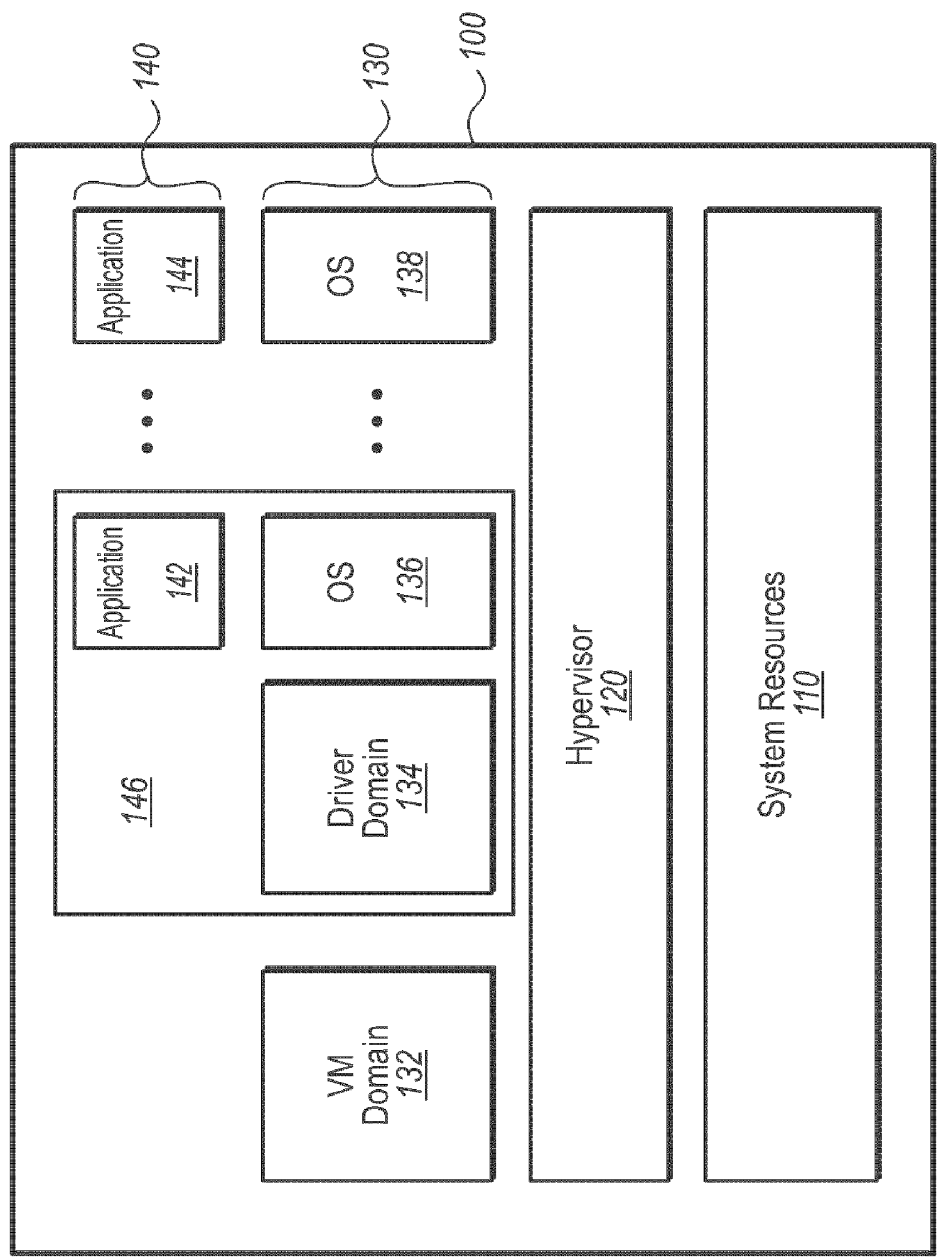
FIG. 1 illustrates a block diagram of an illustrative embodiment of a virtual machine environment that adapts access to physical resources in the virtual machine environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments described herein relate to providing access to physical computing resources in a virtual machine environment. Virtual machines are often built with layers of abstraction. The lowest layer, referred to herein as a hypervisor, has complete access to the actual physical resources of the computing environment. In addition to providing reliable access to the system resources, the hypervisor also provides safety through fault isolation. A fault or attack sourced, for example, from a guest operating system is isolated from other guest operating systems in the virtual machine environment.

In a virtual machine environment, access to the physical resources may be provided through the hypervisor. As a result, access to the physical resources incurs the processing cost of a context switch. The context switch occurs when the environment in which a process or application is executing changes.

For example, a word processing application executing in a virtual machine may need to access a file on a hard drive. The application initially requests access to the file. In a virtual machine environment, the request may be initially received by the guest operating system of the virtual machine. A context switch thus occurs because the environment in which the word processing application is operating changes from the word processing application to the operating system. Because the operating system in the virtual machine does not have direct access to the physical resources, another context switch occurs from the guest operating system of the virtual machine to a virtual device driver, which in turns interacts with the hypervisor. This illustrates that context switches can be a source of measurable performance reduction.

Embodiments described herein may monitor context switches and dynamically adapt the virtual machine environment to improve performance. In one example, certain code segments of the virtual machine are modified, by way of example only, to automatically and dynamically change the domain in which the code segments execute. These modifications can reduce the number of context switches in the virtual machine and improve performance of the virtual machine itself and of the virtual machine environment.

FIG. 1 illustrates a block diagram of an illustrative embodiment of a virtual machine environment 100. The virtual machine environment 100 may include multiple virtual machines or host many virtual machines at the same time. The virtual machine environment 100 may be implemented in, by way of example, a server computer, a client computer, or over a network using distributed computing resources.

The virtual machine environment 100 may include system resources 110, a hypervisor 120, domains 130 and applications 140. The system resources 110 include physical devices or resources of the virtual machine environment 100. Solid-state memory, mass storage devices, graphics accelerators, a network interface, a processor, or the like or any combination thereof are examples of system resources 110.

The hypervisor 120 is an example of an operating system client that controls access to the system resources 110 in the virtual machine environment 100. The hypervisor 120 can implement and manage the virtual resources that are provided to virtual machines instantiated in the virtual machine environment 100. The hypervisor 120 can provide process isolation, policy enforcement, resource sharing, or the like in the virtual machine environment 100. The hypervisor 120 typically has its own resources from the system resources 110 that are protected from the virtual machines.

The domains 130 are examples of virtual machines and include guest operating systems 136 and 138. The domain instances 130 may also include a driver domain 134. The applications 140, which include the applications 142 and 144, are implemented in the respective operations systems 136 and 138. As a result, the applications 142 and 144 can be considered to be part of the respective domains 130.

In FIG. 1, for example, the operating system 136, the application 142 and the drivers 134 are illustrated as a virtual machine 146. In another example, however, the drivers 134 may be a separate virtual machine and the virtual machine 146 may correspond to the operating system 136 and the application 142. The virtual machine 146 is typically isolated from other virtual machines in the virtual machine environment 100.

A virtual machine (VM) domain 132 may be created to manage other domains or virtual machines such as the driver domain 134, and the operating systems 136 and 138. The VM domain 132, for example, may be used to create, destroy, migrate, save, and/or restore other domain instances.

In the virtual machine environment 100, the driver domain 134 is used to instantiate virtual device drivers for other virtual machines such as the guest operating systems 136 and 138. The virtual device drivers in the driver domain 134 can be used to emulate a hardware device included in the system resources 110. The virtual device drivers can be instantiated in a single driver domain 134 or in separate driver domains. Using a separate driver domain for each virtual device driver ensures that when the virtual device driver fails, other domains or layers including the VM domain 132 and the hypervisor 120 survive unaffected.

The hypervisor 120 monitors the driver domain 134 and adapts the implementation of the virtual device driver to improve performance of the virtual machine environment.

Figure 2:
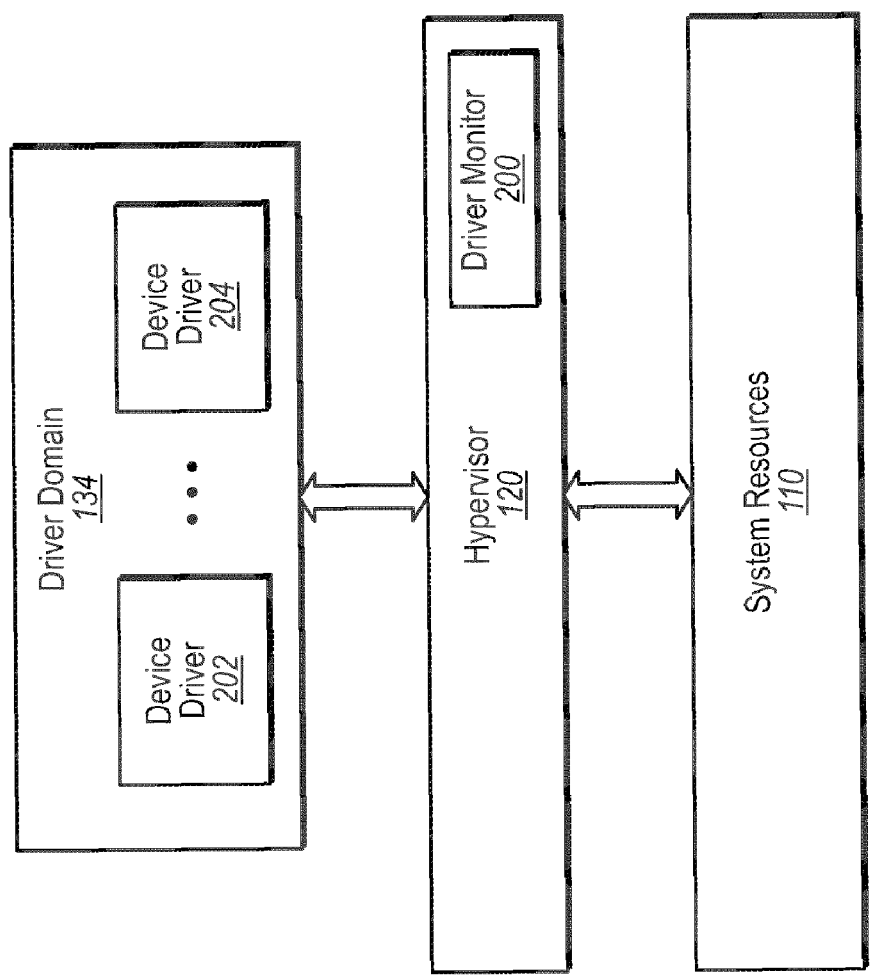
FIG. 2 illustrates a block diagram of an illustrative embodiment of a hypervisor that monitors device drivers in the driver domain.

FIG. 2 illustrates a block diagram of an illustrative embodiment of the hypervisor 120 that monitors the driver domain 134. The driver domain 134 may include a device driver 202, which may be a virtual device driver. The driver domain 134 may also include a device driver 204, which may also be a virtual device driver. Alternatively, the device driver 204 may be in its own driver domain.

The hypervisor 120 includes a driver monitor 200. The driver monitor 200 can improve the performance of the virtual machine environment 100 or of the virtual machines operating in the virtual machine environment 100 by monitoring the device drivers 202 and 204 and adapting the device drivers 202 and 204 according to their respective performance.

For example, an application such as a web browser may desire to access a network. When the web browser is implemented in the virtual machine environment 100, the application experiences a context switch into the driver domain 134 and a context switch into the hypervisor 120.

The driver monitor 200 may monitor the rate of context switches that occur for the device drivers 202 and 204 in order to adapt the device drivers 202 and 204 to improve performance of the virtual machine 146. Adapting the device drivers 202 and 204 can include moving some of the functionality into a different domain or layer of the virtual machine environment 100. For example, the device drivers 202 and 204 can be divided such that a portion of the device driver 202 executes in an untrusted domain such as the virtual machine 146 while another portion of the device driver 202 operates in a trusted domain such as the hypervisor 120.

Figure 3:
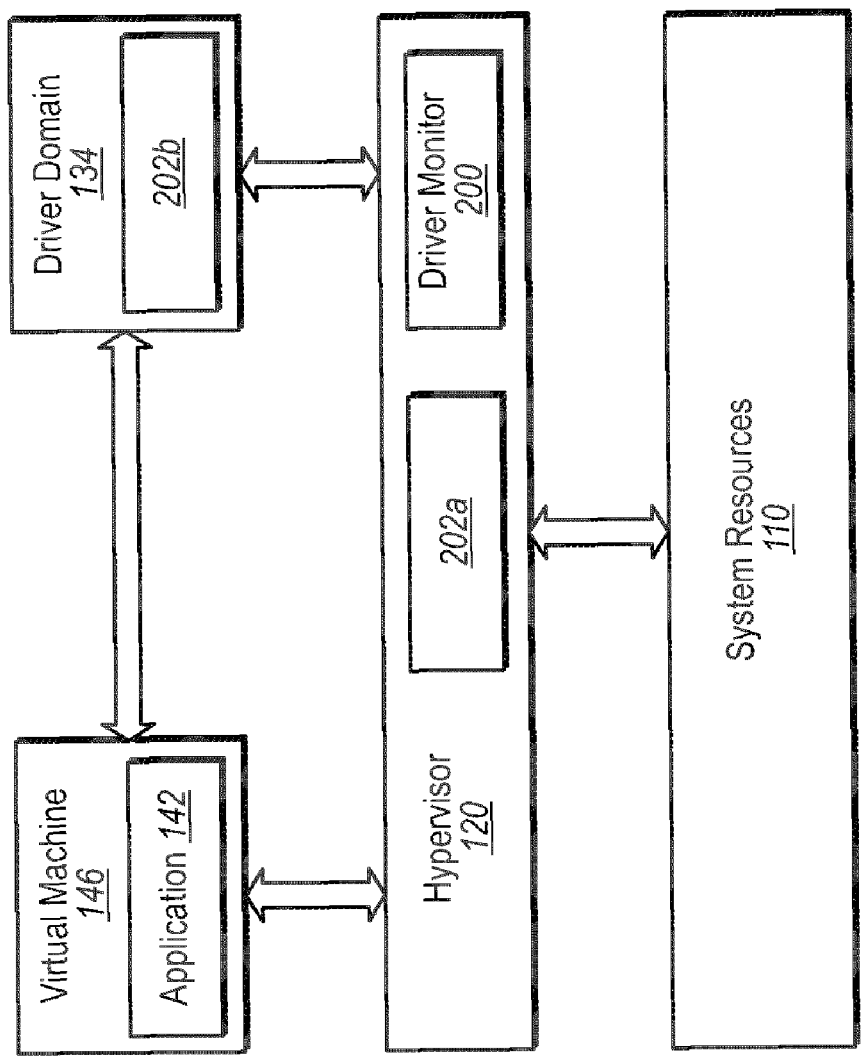
FIG. 3 illustrates a block diagram of an illustrative embodiment of a device driver that has been divided between the driver domain and the hypervisor.

FIG. 3 illustrates a block diagram of an illustrative embodiment of a device driver that has been divided in the virtual machine environment between the driver domain 134 and the hypervisor 120. The device driver 202, represented by drawing reference numbers 202a and 202b, has been dynamically adapted by moving at least a portion of the device driver 202 into the hypervisor 120, which is a trusted domain.

The driver monitor 200 is configured to monitor the performance of the device driver 202. The driver monitor 200 monitors the context switches performed by the device driver 202 or that are associated with the device driver 202. The context switches performed by the device driver 202 can be reflected in a rate of context switches.

The driver monitor 200 may be monitoring multiple device drivers in the driver domain 134. As a result, the driver monitor 200 can identify the device drivers that have the highest rate of context switches. Alternatively, the driver monitor 200 can perform control and dataflow analysis to identify the device drivers that are underperforming.

Once the device driver 202 has been identified as having a comparatively high rate of context switches, the driver monitor 200 can automatically and/or dynamically produce slices of the device driver 202.

FIG. 3 illustrates that the device driver 202 has been divided into a driver portion 202a and a driver portion 202b. In some instances, the driver portion 202b may still be a complete driver, but certain functionality is implemented by the driver 202a.

The driver portions 202a and 202b include stand alone elements of the original device driver 202 that can execute separately and independently. The driver portion 202a can execute in the trusted domain of the hypervisor 102 while the driver portion 202b continues to operate in the driver domain 134, which may be an untrusted domain.

In one embodiment, the device driver 202 can be divided or sliced using control and dataflow analysis techniques that identify the stand alone functionality of the device driver 202. This allows stand alone code segments to be divided and implemented as the driver portion 202a. For example, the driver monitor 200 can track data from a network interface relative to the device drivers. By monitoring the data flow with the device driver 202, the driver monitor 200 can determine that the device driver 202 is associated with context switches and may benefit from being divided. Control flow techniques can be used to identify software loop structures that consume significant amounts of time or subroutine components that provide convenient execution partitioning. Dataflow techniques can serve to identify those instructions that touch specific data so that the system can avoid copying data across different trust domains.

Just in time (JIT) binary code translation can be used to patch each memory reference made by the driver portion 202a so that it is dynamically checked and guaranteed to be safe. For instance, although the driver 202 is implemented as the driver portions 202a and 202b, there may only be one location for data of the driver 202. The data for the driver 202 is typically stored in the data space of the driver domain 134. As a result, the driver portion 202a does not store or access any hypervisor data structures, which ensures that the driver portion 202a does not adversely impact the hypervisor 120 with corrupt data.

The driver portion 202a can access the data using software supported address translation. This approach allows the driver portion 202a to access the driver data structures from any guest domain context, thereby avoiding context switching and improving performance. In one example, a translation table is provided that maps from virtual memory page addresses in the address space of device domain 134 to mapped page addresses in the address space of the hypervisor 120. The mapped page address in a translation table entry is a hypervisor page that maps to the same physical page as the page address in the device domain 134. At runtime, every memory access to the data in the address space of the device domain 134 from the driver portion 202a in the hypervisor 120 is first translated using the translation table into a mapped address and the memory is made using the translated address.

Accordingly, the driver monitor 200 can identify which device drivers should be sectioned or divided into portions by monitoring the performance of the device drivers in the device domain 134. Similar data analysis techniques can be applied to JIT compilation systems to identify the code segments that are frequently executed and thus beneficially accelerated in the hypervisor 120.

Normally, incorporating software from an untrusted domain like the driver domain 134 into a trusted domain like the hypervisor 120 is unacceptable. As previously stated, memory references from the driver portion 202a can be rewritten in software and checked at runtime for safety.

Figure 4:
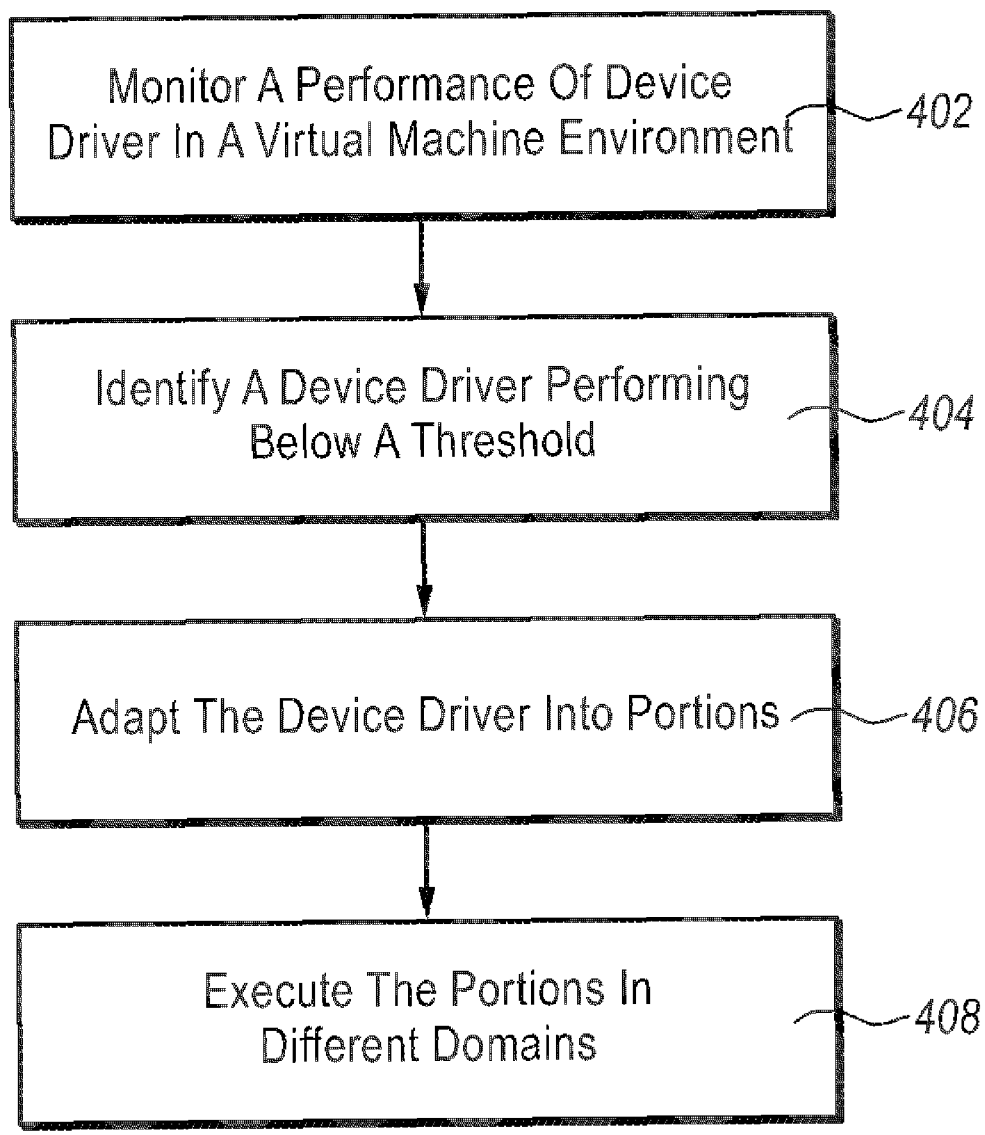
FIG. 4 illustrates a flow diagram of an illustrative embodiment of a method for accessing physical resources in the virtual machine environment.

FIG. 4 illustrates a flow diagram of an illustrative embodiment of a method for accessing physical resources in a virtual machine environment. In block 402, the hypervisor monitors a performance of the device driver in the virtual machine environment. The performance of the device driver has an impact on the performance of the virtual machine.

The hypervisor then identifies a device driver that is performing below a threshold in block 404. For example, tracking the rate of context switches for device drivers can be used to identify underperforming device drivers.

In block 406, the hypervisor adapts the driver into portions. These portions are typically stand alone portions of the driver that can run independently. In block 408, the portions of the driver are run in different domains. Specifically, one portion may be run in a trusted domain while another portion may be run in an untrusted domain.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

Figure 5:
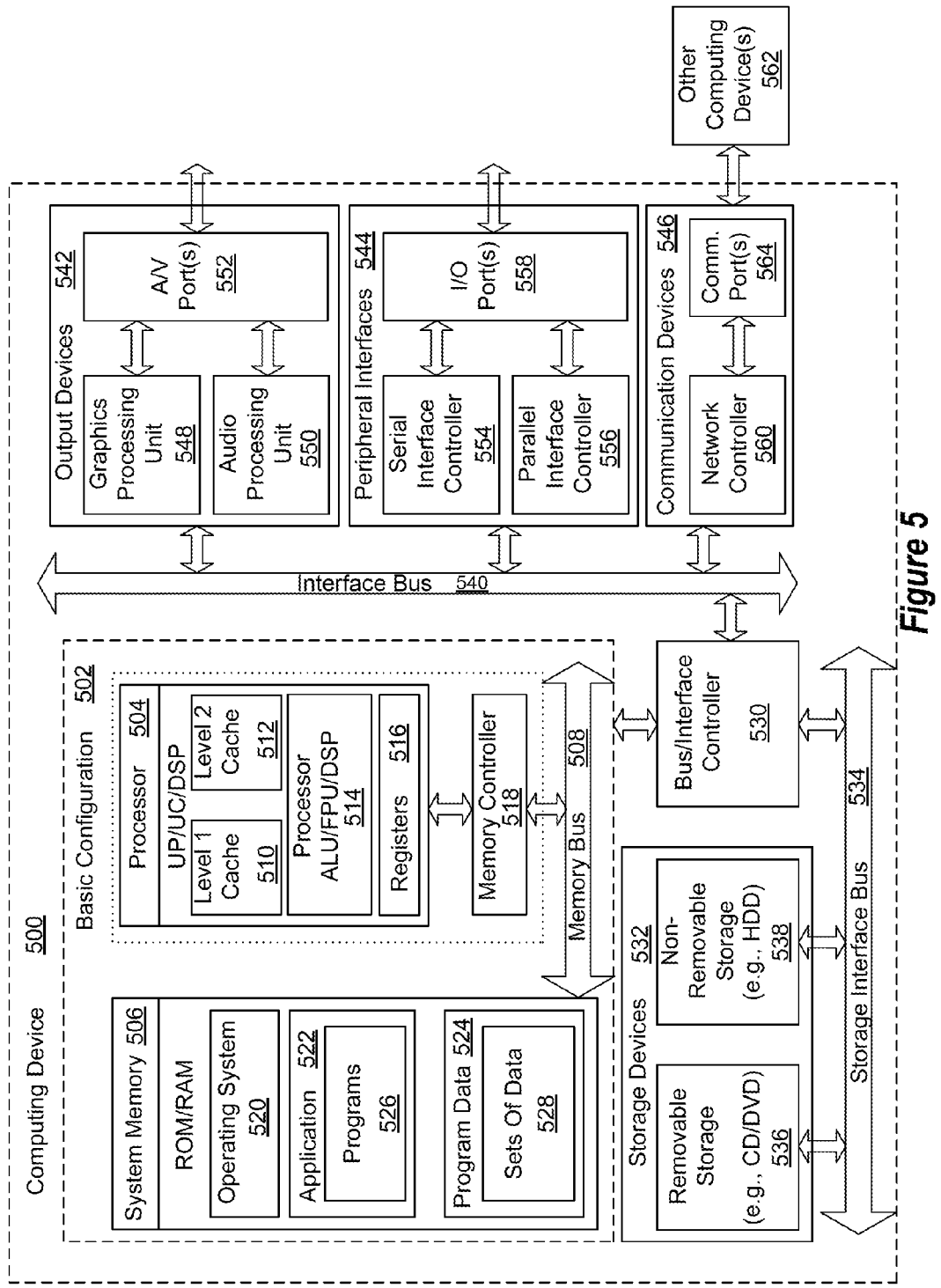
FIG. 5 illustrates an example computing device that is arranged for providing access to physical resources in a virtual machine environment in accordance with the present disclosure.

FIG. 5 is a block diagram illustrating an example computing device 500 that is arranged for providing access to physical resources in a virtual machine environment in accordance with the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor ($\mu$P), a microcontroller ($\mu$C), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include an application program for providing access to physical resource 526 that is arranged to dynamically adapt code segments to run in different domains to improve performance of a virtual machine. Program Data 524 may include data that is indicative of the performance of applications or device drivers in virtual machines 528 that may be useful for dividing the device driver into portions or slices that can run as standalone segments in different domains or contexts. In some embodiments, application 522 may be arranged to operate with program data 524 on operating system 520 such that code segments can be dynamically divided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," at "least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. In a system including a processor and memory, a method for accessing physical resources in a virtual machine environment, the method comprising:

monitoring a performance of device drivers operating in a virtual machine running in the virtual machine environment, the monitoring comprising monitoring context switching for each of the device drivers, the virtual machine environment including a trusted domain and a driver domain and the device drivers operating in the driver domain;

identifying a device driver from among the device drivers according to a performance characteristic of the device driver, wherein the device driver is performing below a predetermined threshold;

dividing the identified device driver into a first portion and a second portion after identifying that the device driver is performing below the predetermined threshold based on a rate of context switches; and executing the first portion in the trusted domain and executing the second portion in the driver domain.

2. The method of claim 1, wherein monitoring a performance of device drivers further comprises performing dataflow analysis for at least one of the device drivers.

3. The method of claim 1, wherein identifying a device driver further comprises identifying the device driver when the device driver experiences more context switches compared to other device drivers.

4. The method of claim 3, wherein the context switches are measured by tracking the rate of context switches for each of the device drivers.

5. The method of claim 1, wherein the first portion and the second portion comprise stand alone segments of the particular device driver.

6. The method of claim 5, further comprising patching each memory reference of the first portion dynamically for safety by performing just in time binary code translation for each memory reference when executing the first portion in the trusted domain.

7. The method of claim 1, wherein dividing the device driver further comprises dynamically modifying the particular device driver during operation of the virtual machine environment to generate the first portion and the second portion.

8. A method for providing access to physical computing resources in the context of an operating system running in a virtual machine, the method comprising:
monitoring a performance of device drivers operating in a driver domain, the monitoring comprising determining a rate of context switches associated with the device drivers;
identifying a device driver from among the device drivers with the rate of context switches exceeding a switching threshold;
dynamically dividing the identified device driver into a first portion and a second portion while the operating system is executing and when the rate of context switches exceeds the switching threshold, wherein the first and second portions each comprise stand alone code segments; and
running the first portion in a trusted domain and running the second portion in the driver domain.

9. The method of claim 8, further comprising storing data used by the first portion in the driver domain or in the virtual machine, wherein access to the data is achieved using address translation to preserve a safety of the trusted domain.

10. The method of claim 8, wherein the trusted domain comprises a hypervisor and wherein the first portion transmits and receives packets on behalf of the virtual machine.

11. The method of claim 8, wherein the virtual machine invokes the first portion without a context switch.

12. A device for controlling access to physical resources in a virtual machine environment, the device comprising:
physical resources including at least a processor and memory;
a hypervisor stored in the memory, wherein the hypervisor establishes a trusted domain in the virtual machine environment and a driver domain in the virtual machine environment; and
a driver monitor stored in the memory, wherein the driver monitor uses the processor to monitor a performance of device drivers operating in the driver domain by determining a rate of context switches associated with the device drivers to identify a device driver performing below a threshold and divides the identified device driver into at least a first portion and a second portion when the performance of the device driver is below the threshold based on the rate of context switches, the first portion operating in the trusted domain and the second portion operating in the driver domain.

13. The device of claim 12, wherein the first portion and the second portion each comprise stand alone segments of the device driver.

14. The device of claim 12, wherein the performance of the device driver fails when the rate of context switches is above a predetermined rate.

15. The device of claim 12, wherein the driver monitor performs a dataflow analysis to determine the performance of the device driver.

16. The device of claim 12, wherein the memory comprises at least one of ROM and memory assigned to the hypervisor.

17. The device of claim 16, wherein the driver monitor dynamically divides the device driver into the first portion and the second portion while a virtual machine that uses the device driver is running in the virtual machine environment.

18. The device of claim 12 wherein the driver monitor changes address references for the first portion operating in the trusted domain to maintain safety for the virtual machine environment.

19. The device of claim 12, wherein the driver monitor performs just in time binary code translation to patch each memory reference of the first portion, wherein data for the device driver is stored in the driver domain.

* * * * *

UNITED STATES PATENT AND TRADEMARK OFFICE
CERTIFICATE OF CORRECTION

PATENT NO. : 8,327,358 B2
APPLICATION NO. : 12/635319
DATED : December 4, 2012
INVENTOR(S) : Mangione-Smith It is certified that error appears in the above-identified patent and that said Letters Patent is hereby corrected as shown below:

On the Title Page, in Field (56), under "OTHER PUBLICATIONS", in Column 2, Line 1, delete "High" and insert -- "High --, therefor.

On the Title Page, in Field (56), under "OTHER PUBLICATIONS", in Column 2, Line 2, delete "Machines;" and insert -- Machines;" --, therefor.

On the Title Page, in Field (56), under "OTHER PUBLICATIONS", in Column 2, Line 3, delete "A" and insert -- "A --, therefor.

On the Title Page, in Field (56), under "OTHER PUBLICATIONS", in Column 2, Line 4, delete "Machines;" and insert -- Machines;" --, therefor.

On the Title Page, in Field (56), under "OTHER PUBLICATIONS", in Column 2, Line 5, delete "The Design and Implementation of Microdrivers;" and insert -- "The Design and Implementation of Microdrivers;" --, therefor.

On Page 2, in Field (56), under "OTHER PUBLICATIONS", in Column 1, Line 3, delete "et al" and insert -- et al. --, therefor.

On Page 2, in Field (56), under "OTHER PUBLICATIONS", in Column 1, Line 5, delete "WAshington," and insert -- Washington, --, therefor.

On Page 2, in Field (56), under "OTHER PUBLICATIONS", in Column 1, Line 7, delete "et al" and insert -- et al. --, therefor.

On Page 2, in Field (56), under "OTHER PUBLICATIONS", in Column 1, Line 10, delete "et al" and insert -- et al. --, therefor.

Signed and Sealed this
Ninth Day of April, 2013

Teresa Stanek Rea
*Acting Director of the United States Patent and Trademark Office*

CERTIFICATE OF CORRECTION (continued)
U.S. Pat. No. 8,327,358 B2

On Page 2, in Field (56), under "OTHER PUBLICATIONS", in Column 2, Line 3, delete "et al" and insert -- et al. --, therefor.

In Fig. 5, Sheet 5 of 5, delete "UP/UC/DSP" and insert -- $\mu P/\mu C/DSP$ --, therefor.

In Column 12, Line 37, in Claim 18, delete "12" and insert -- 12, --, therefor.